United States Patent [19]

Schultz

[11] Patent Number: 4,806,424

[45] Date of Patent: Feb. 21, 1989

[54] ELECTRICAL CONDUCTOR INSULATED WITH INSULATING AND JACKETING MATERIAL HAVING IMPROVED RESISTANCE TO HOT FLUIDS AND GASES

[75] Inventor: Robert E. Schultz, Lawrence, Kans.

[73] Assignee: Camco, Incorporated, Houston, Tex.

[21] Appl. No.: 924,884

[22] Filed: Oct. 30, 1986

Related U.S. Application Data

[63] Continuation of Ser. No. 638,151, Aug. 6, 1984, abandoned.

[51] Int. Cl.$^4$ .................. B32B 9/00; B32B 15/00; B32B 27/00; H01B 7/00
[52] U.S. Cl. .................. 428/372; 174/120 SR; 428/383; 428/389; 428/390; 428/391; 428/380
[58] Field of Search ............... 428/375, 379, 380, 383, 428/389, 390, 391, 372; 174/120 SC, 120 SR, 110, 107

[56] References Cited

U.S. PATENT DOCUMENTS 3,485,937 12/1969 Brown et al. .................. 174/107

Primary Examiner—Lorraine T. Kendell
Attorney, Agent, or Firm—Fay, Sharpe, Beall, Fagan, Minnich & McKee

[57] ABSTRACT

The present invention relates to a polymer composition exhibiting high temperature oil resistance, while having improved modulus and tensile strength, as well as a novel insulated electrical conductor employing such material, said material comprising a polymeric constituent selected from the group consisting of copolymers of ethylene and propylene, polymers of same with other polymerizable materials, and mixtures of the foregoing, said constituent being in intimate mixture with from about 1 to about 150 parts by weight (per 100 parts by weight of polymer) of processing oil, and a calcined aluminum silicate clay filler containing less than about 0.5 percent by weight water (based on the weight of the clay) having an average particle size less than 1 micron with at least about 80 weight percent of the particles having size finer than 2 microns and with as much as 10 weight percent of the particles being more finely divided than 0.5 microns.

6 Claims, No Drawings

ELECTRICAL CONDUCTOR INSULATED WITH INSULATING AND JACKETING MATERIAL HAVING IMPROVED RESISTANCE TO HOT FLUIDS AND GASES

This is a continuation of co-pending application Ser. No. 638,151 filed on Aug. 6, 1984, and now abandoned.

BACKGROUND OF THE INVENTION

In the manufacture of electric cables, particularly those having a conductor insulated with a multi-layer covering, for use at elevated temperatures under extreme pressure and exposure to oil and water environments, it has been found useful to employ an insulation comprising a thermosetting rubber containing ethylene and propylene usually referred to as an "ethylene-propylene rubber" or "EP rubbers". The ethylene-propylene rubber may be a copolymer, though more commonly it is an ethylene-propylene-diene-monomer terpolymer which, in turn, is usually referred to as an "EPDM". Such cables are disclosed, for example, in U.S. Pat. No. 4,088,830, and typical insulation formulations compounded from such EPDM polymers together with additional constituents, such as suitable processing aids, curing agents and the like, have been shown, for example, in U.S. Pat. No. 3,926,900. In particular, it is accepted practice to add so-called processing oils to retard swelling from contact with hot fluids and well gases.

Suitable EP rubbers and EPDM polymers are available from a variety of sources included UNIROYAL under the trademark ROYALENE and E. I. Du Pont under the trademark NORDEL. The final formulation or "compound", however, typically will also include curing agents, processing aids, fillers, pigments and/or cross-linking agents. In general, the selection of a particular curing system, or other additive, is usually a matter of choice for the individual formulator subject to certain well-known characteristics attributable to specific additives.

In formulating compounds from such ethylene-propylene rubber compositions, it has been necessary to strike a balance between the desire for compounds having better physical characteristics, i.e. modulus, hardness etc., and the counterbalancing highly undesirable changes in other physical properties. For example, it is generally accepted in EP rubber compounding that higher modulus compounds can be obtained by using carbon black or precipitated silica fillers. However, these fillers are unsuitable for cable applications because they seriously degrade the electrical properties. In other words, even though it is known that compounds having the desired higher modulus could be obtained using carbon black or precipitated silica fillers, in cable applications, it has been traditional to use clay as the filler because the electrical properties are the principal properties which must be maintained. Similarly, while it has long been desired to further retard swelling from well fluids, the addition of more processing oil to achieve such an end will also result in a lowering of modulus, hardness, and other physical properties.

Nevertheless, it has long been desired to formulate an EP rubber based compound which would have better resistance to swelling due to contact with well gases and hot fluids, without the heretofore commensurate reduction in modulus and hardness, so that the resulting insulation would still be resistant to mechanical deformation at room temperature. Such insulation deformation frequently occurs during the cable armoring process, as well as when the cable is handled during service.

It has also long been desired to produce a cable with a multi-layer covering over the conductor wherein the thermosetting rubber insulation has not only excellent electrical insulation properties and physical properties, such as modulus and hardness; but, also improved resistance to swelling after exposure to well gases and hot fluids.

Accordingly, it is a principal object of the present invention to provide an electrical cable of the type used in oil and gas wells which has not only excellent physical and chemical properties, but also improved resistance to exposure to well gases and hot fluids.

In addition, other objects of the invention will become apparent to those skilled in the art from a reading of the following specification and claims.

SUMMARY OF THE INVENTION

In one aspect, the present invention relates to a filled material, e.g., an electrical insulation composition having improved high temperature oil resistance without substantial reduction in modulus and/or tensile strength. The material comprises an ethylene-propylene rubber having an increased level of processing oil and as the filler in the compound, a calcined aluminum silicate clay having an average particle size less than about 1 micron, with at least about 80 weight percent of the particles having size finer than about 2 microns and with at least about 10 weight percent of the particles being more finely divided than 0.5 microns.

In yet another aspect, the present invention is directed to an insulated electric cable having a metallic conductor, an insulating layer of material as hereinbefore described and a tough outer layer.

The cable of the present invention is fabricated using conventional techniques, but employing as the thermosetting rubber insulating jacket an EP rubber compound containing from about 1 to about 150 parts by weight of processing oil, per 100 parts by weight of rubber, and containing as the filler, a calcined fine particle size aluminum silicate clay. The clay filler has an average particle size less than about 1 micron with at least 80 weight percent of the particles having a size finer than about 2 micron, and with as much as 10 weight percent of the particles being more finely divided than about 0.5 microns.

The EP rubber compounds and the insulated and jacketed electrical conductors of the present invention are especially suitable for service in oil field use. This is particularly so, as these compounds have retarded swelling and deformation when in contact with hot fluids, which contact would otherwise lead to accelerated deterioration of cable insulator and jacketing materials.

In the past, cables intended for use in such applications sometimes contained as much as from about 60 to 100 percent by weight (based on the weight of the rubber) of processing oil to retard swelling, but typically could adversely effect modulus and/or hardness. The compounds of the present invention can now generally contain from about 1 to about 150 percent by weight processing oil to provide improved swell resistance, yet still exhibit excellent characteristics in terms of other physical properties.

DESCRIPTION OF THE PREFERRED EMBODIMENTS

The insulators of the present invention are based upon synthetic rubber. Although the term "rubber" is found useful herein, the expression "polyolefin elastomer" may also be used. The suitable materials will almost always be an EPDM rubber, although the use of other EP rubbers are also contemplated. The EPDM rubbers will usually include only a relatively minor proportion of a diene. Suitable dienes can include dicyclopentadiene, the hexadienes, e.g., 1,4-hexadiene and norbornadiene.

In compounding the compositions of the present invention, the particular rubber used will typically have a molecular weight of from about 100,000 to about 1,000,000. When considering the ethylene and propylene content of the rubber, for the purposes of the present invention, the rubber should be quite carefully selected so that the ethylene content dominates. Advantageously for enhanced insulation characteristics, the rubber will have a major ethylene content, e.g., of about 50 weight percent or more ethylene, based on the ethylene plus propylene weight. Furthermore, for best insulator properties, it is preferred that a rubber be selected having a high ethylene content, on the order of 80 weight percent or so, though in order to avoid adverse increases in the coefficient of thermal expansion, an ethylene content higher than about 60 weight percent may be undesirable. Moreover, care should be taken that the rubber also have a high Mooney viscosity, generally in the range of about 40 to about 90 and typically on the order of 78 at 125° C. (ML 1+4).

It has been conventional to include an antioxidant with the rubber, e.g., typically on the order of about 1 to about 2 weight parts of antioxidant per 100 weight parts of rubber, with polydihydrotrimethylquinoline being most generally employed. In curing, the cross-linking of the polyolefin elastomers may be acceptably affected with an organic peroxide cross-linking curing agent, although other such agents find utility, as is well-known to those skilled in the art. Also, a principal agent often is used in combination with a co-curing agent.

Suitable organic peroxide curing agents include dicumyl peroxide; 2,5-dimethyl-2,5(t-butyl peroxy)hexane; 2,5-dimethyl-2,5(t-butyl peroxy)hexyne-3 and similar tertiary diperoxides. Suitable co-agents for curing are m-phenylene diamine, 1,2-polybutadiene homopolymer and trimethylolpropane trimethacrylate. Amounts of curing agent used may vary from on the order of about 1 to 2 weight parts, based on the weight of all other composition ingredients, up to as much as 6 to 8 weight parts or more. Because of the higher processing oil levels in the compound of the present invention, the level of peroxide should be somewhat higher than is conventional for similar compounds having less than about 100 parts by weight of processing oil.

The critical constituent for compounding the materials of the present invention is a fine particle size, calcined aluminum silicate clay. By fine particle size is initially meant a clay having an average particle size of less than 1 micron. Moreover, this very finely divided material should have 80 weight percent or more of the particles having size less than 2 microns. Furthermore, the calcined clays should have on the order of at least about 10 weight percent, and more typically about 12 to about 17 weight percent of particles finer than about 0.5 micron. Thus, although average particle size is important, and this may typically be within the range of from about 0.6 to about 0.9 micron, particle size distribution is also important. Virtually all particles will be more finely divided than about 20 microns. Suitable finely divided calcined clays will show on the order of about 60 to about 75 weight percent of particles more finely divided than 1 micron and have 80 to about 90 weight percent finer than 2 microns.

It is also important that the clay be a calcined aluminum silicate as opposed to a softer or hydrous clay. A typical chemical analysis of a suitable clay can be expected to show an about 44 weight percent proportion of alumina and an about 52 weight percent proportion of silica. Stated another way, the clay fillers useful herein will be found to be composed of over 95 percent aluminum silicate. Typical chemical analysis will show less than about 0.5 percent by weight water and the balance to be virtually all oxides, such as of titanium, iron, sodium, potassium, calcium and magnesium. As these additional oxides behave in the manner of inert materials, they do not detract from the acceptability of the aluminum silicate clay filler. It should, therefore, be understood that the highly calcined aluminum silicate filler useful herein can include up to about 5 weight percent of residual impurities.

Such filler finds use when employed in the range of from about 20 weight parts up to about 200 weight parts, or even more, per 100 weight parts of rubber. It is, however, more typical to find the filler used in a proportion more closely paralleling the amount of the rubber. Hence, most usually there is employed from about 60 to about 150 weight parts of filler for 100 weight parts of rubber. Preferably, for best insulation characteristics, the filler is used in an amount within the range of from about 80 to about 120 weight parts, per 100 weight parts of rubber.

It is to be understood that additional finely divided hard particulate materials may be present in the composition. Such can be particularly useful in compounds for preparing tough jackets around insulating layers. When such additional material is used, the amount of the clay filler can be cut back without a deleterious effect on compound properties. Moreover, these additional particulates may be used in varied amounts, and such amounts can depend on whether there is being formulated an insulating material or other compound, e.g., an outer jacketing material for an insulated electric conductor. Finely divided silica has been used for the additional particulate, and the addition of titanium dioxide is also contemplated. For example, from about 20 to about 60 weight percent or more (based on the weight of the clay) of finely divided silica has been found to be useful in the preparation of jacketing compound. It is also common practice to add an ingredient, such as zinc oxide, to the formulation, as well as to include red lead oxide, sometimes referred to in the art as a vulcanizing agent. These ingredients can likewise be present as finely divided-particulate ingredients. It is also to be understood that some constituents, e.g., commercially available curing agent, can be available as a mixture with clay other than the calcined, fine particle size clay used in the present invention. The introduction of small amounts of such clays, e.g., on the order of up to 5 to 10 weight percent or so, basis the weight of the calcined clay, is generally acceptable.

It is intended that the calcined aluminum silicate filler preferably be present in treated condition in the filled compound. More particularly, this is meant to be a silicone liquid surface treatment of the filler. The surface treatment of aluminum silicate with a silicone liquid, and especially with an organic polysiloxane, has been shown, for example, in U.S. Pat. No. 3,148,169. Typically, a vinyl silane, such as vinyl-tris(2-methoxyethosy)silane, is used. Usually as little as 1 to 2 weight parts of the vinyl silane per 100 weight parts of the clay filler is serviceable, as will be understood by those skilled in the art. For convenience, the term "silicone liquid" has been used herein and is meant to include the use of the silanes, as well as various siloxane compounds.

Reference has frequently been made herein to the use of invention compositions for electrical insulation, as well as for use in an insulated electric conductor as a jacketing material. Such jacket and insulation use, which may be integral layers of jacket and insulation materials, can be particularly serviceable in oil well cable and motor lead cable. It is, however, to be understood that materials may be serviceable in non-cable parts, as well as in non-oil field uses, e.g., as packer seals and gasketing materials.

As noted earlier, where the composition is intended to be used as an insulator or jacketing material for service in fluid contact, such as in oil well cable, ingredients might be a liquid 1,2 polymerized butadiene to retard swelling in oil, as discussed in U.S. Pat. No. 3,926,900. These further ingredients may also include so called processing oils, e.g., napthenic or paraffinic oils, also known as compounding oils. These processing oils will sometimes be present in an amount from on the order of about 1.0 weight parts or more, as for example, up to about 150 weight parts or more, based on 100 wieght parts of composition rubber.

In the past, where the composition was to be used as an insulator for the electrical conductor, it was known to use as much as of about 60 weight parts of processing oil, per 100 weight parts of the rubber but such levels reduced the physical properties of the composition. Jacket compositions could typically include somewhat higher level of such oils. In some cases, the upper limit of processing oil was defined by the point at which any higher concentration would result in a lowering of the physical properties below defined minimum limits, while in the other cases, the upper limit was a matter of "compatability". That is to say, if too much processing oil is added, part of all of the excess may migrate to the surface of the molded end product as "blooming" or even exudation. The compositions of the present invention, on the other hand, contain up to as much as about 150 parts by weight of processing oil or even more, yet still having a modulus and hardness in the generally desirable range (typically a 100% modulus value of from above 500 PSI to about 2000 PSI and a hardness of from about 60 to about 90 durometers Shore A), and show no sign of any compatability problems.

It is to be understood that a variety of additional constituents, generally present individually in only very minor amounts, e.g., 1 to 2 weight parts per 100 weight parts of rubber, and in the aggregate typically present in amounts of only 5 weight parts or so, basis 100 weight parts of rubber, might nevertheless be useful in compositions of the present invention. Representatives of such useful substituents can be various lubricants.

The following examples show ways in which the invention has been practiced but should not be construed as limiting the invention. In the examples, all parts or percentages are parts or percentages by weight unless otherwise clearly designated or obvious from the context.

In these examples, ingredients for the compositions are compounded in a suitable manner, such as on a mill or in a Banbury mixer. Generally the ingredients, less curing agent, are initially blended together at a moderate temperature, e.g., 270° F., for on the order of 2 to 3 minutes. Curing agent, usually peroxide curing agent, is added to the admixed ingredients typically at about a half a minute into the final mixing, while this final mixing continues for approximately 3 to 5 minutes. The compounds are then ready for forming into test shapes and curing to a thermoset condition by heat application.

The foregoing examples clearly establish that the novel insulating compositions, and the novel electric cables fabricated using these insulating compositions, exhibit a highly desirable and unexpected improvement resistance to swelling on exposure to hot fluids and gases, without sacrificing in modulus, tensile, hardness or other physical properties.

It will be obvious that many changes, substitutions and alterations can be made in the compositions, procedures and devices hereinbefore described without departing from the scope of the invention herein disclosed and it is our intention to be limited only by the appended claims.

TABLE 1

| INGREDIENT | 1A | 1B | 2A | 2B | 3A | 3B |
|---|---|---|---|---|---|---|
| Nordel 1145 (EPDN, Mooney Viscosity ML I + 4 at 121° C. - 45) | 31.22 | 31.37 | 28.51 | 28.65 | 26.23 | 26.37 |
| AgeRite Resin D (Polymerized 1,2-dihydro-2,2,4 trimethyl quinoline) | 0.47 | 0.47 | 0.43 | 0.43 | 0.39 | 0.40 |
| Al-Sil-Ate S (Calcined Aluminum Silicate) | 46.83 | — | 49.88 | — | 52.46 | — |
| Burgess KE (Silane treated Calcined treated Aluminum Silicate) | — | 47.06 | — | 50.14 | — | 52.74 |
| Vinyl Silane (Vinyl-tris (2-methoxyethyoxy) Silane) | 0.47 | — | 0.51 | — | 0.52 | — |
| Zinc Oxide | 1.56 | 1.57 | 1.42 | 1.43 | 1.31 | 1.32 |
| Hystl B-3000 (Liquid 1,2-polybutadiene resin) | 6.24 | 6.27 | 5.70 | 5.73 | 5.25 | 5.27 |
| Sunpar 2280 (Paraffinic oil) | 9.37 | 9.41 | 9.98 | 10.03 | 10.49 | 10.55 |
| Red Lead ($Pb_3O_4$) | 1.87 | 1.88 | 1.71 | 1.72 | 1.57 | 1.58 |
| DiCup 4-OKE (Di-cumyl Peroxide, 40% active on clay) | 1.97 | 1.96 | 1.86 | 1.86 | 1.77 | 1.77 |
| Tensile Strength, psi | 1991 | 1472 | 1899 | 1462 | 1472 | 1402 |
| Elongation at break, % | 137 | 127 | 115 | 140 | 113 | 137 |
| Crescent Tear, ppi | 151 | 136 | 146 | 147 | 168 | 142 |

TABLE 2

| Physical Properties | Commercial Jacket Material | Commercial Insulating Material | Composition of The Present Invention |
|---|---|---|---|
| Elongation, % | 156 | 160 | 135 |
| Tensile, PSI | 1780 | 1200 | 2370 |
| Crescent tear, PPI | 250 | 125 | 240 |
| Hardness, Shore A | 90 | 68 | 86 |
| Oil Aging, 70 Hr, 150° C., ASTM #3 | | | |
| Elongation, % % ret | 90 · 58 | 70 · 56 | 100 · —4 |
| Tensile, PSI % ret | 990 · 50 | 440 · 37 | 1415 · 36 |
| Hardness, Shore A | 67 | — | 67 |
| %, Cross-sectional area | 61 | 78 | 50 |
| %, Weight gain | 70 | 90 | 51 |
| ELECTRICAL PROPERTIES | | | |
| Before Conditioning | | | |
| Volume Resistivity, ohm cm | $1.6 \times 10^{15}$ | $1.5 \times 10^{16}$ | $8.8 \times 10^{15}$ |
| Dielectric Constant | 2.80 | 2.34 | 2.34 |
| Power Factor, % | 2.98 | 0.27 | .24 |
| Dielectric strength, VPM | 685 | 765 | 743 |
| After 14 Days, 100° C., H$_2$O | | | |
| Volume Resistivity, ohm cm | $2.8 \times 10^{11}$ | $3.5 \times 10^{15}$ | $3.8 \times 10^{15}$ |
| Dielectric Constant | 14.00 | 2.48 | 2.62 |
| Power factor, % | 11.06 | 0.44 | .32 |
| Dielectric strength, VPM | 363 | 666 | 718 |

What is claimed is:

1. An insulated electric conductor comprising:
   a. a metallic conductor;
   b. an insulating layer enclosing at least a part of said conductor comprising a polymeric constituent selected from the group consisting of copolymers of ethylene and propylene, polymers of the same with other polymerizable materals, and mixtures of the foregoing, said constituent being in intimate mixture with from about 1 to about 150 parts by weight of processing oil per 100 parts by weight of polymeric constituent, and with calcined aluminum silicate clay filler containing less than about 0.5 percent by weight of water and having an average particle size less than 1 micron with at least 80 weight percent of the particles having a size finer than 2 microns and with at least about 10 weight percent of the particles being more finely divided than 0.5 micron, virtually all of said clay filler particles being more finely divided than about 20 microns with above about 60 weight percent being finer than 1 micron; and,
   c. a tough outer wear layer enclosing at least a part of said insulating layer.

2. The insulated electric conductor of claim 1 wherein said polymeric constituent of said inner layer is an ethylene-propylene-diene-monomer terpolymer.

3. The insulated electric conductor of claim 2 wherein said clay filler has been treated with a silicone liquid treatment agent.

4. The insulated electric conductor of claim 3 wherein said silicone liquid treatment agent is present in an amount of at least 1.0 parts by weight, per 100 parts by weight of said clay.

5. The insulated electric conductor of claim 4 wherein said insulating layer has a 100% modulus value of at least about 500 psi and a hardness of at least about 600 durometers (Shore A).

6. The insulated electric conductor of claim 5 wherein said outer wear layer is a tear-resistant layer comprising calcined aluminum silicate clay filler and a polymeric constituent selected from the group consisting of copolymers of ethylene and propylene, polymers of the same with other polymerizable materials, and mixtures of the foregoing in combination with at least about 20 weight percent, based on the weight of said clay filler, of additional finely divided particulate filler.

* * * * *

UNITED STATES PATENT AND TRADEMARK OFFICE
CERTIFICATE OF CORRECTION

PATENT NO. : 4,806,424

DATED : February 21, 1989

INVENTOR(S) : Robert E. Schultz

It is certified that error appears in the above—identified patent and that said Letters Patent is hereby corrected as shown below:

Claim 5, line 4;
   Column 8, line 38 "600" should read --60--.

Signed and Sealed this

Twenty-fifth Day of February, 1992

Attest:

HARRY F. MANBECK, JR.

Attesting Officer

Commissioner of Patents and Trademarks